Nov. 25, 1969      L. POLLAK      3,480,322
SUN VISOR
Filed March 29, 1968
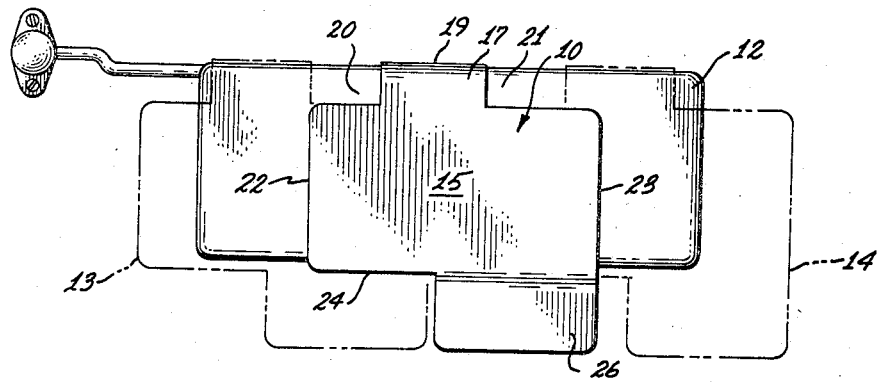
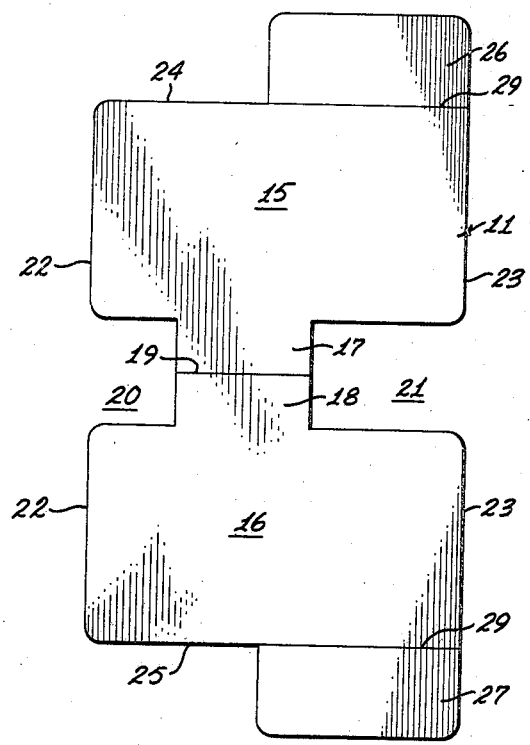
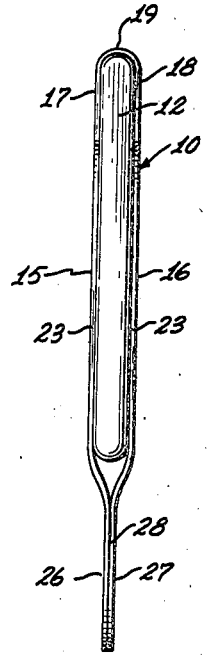
INVENTOR.
LUD POLLAK
BY
ATTORNEY 3,480,322
United States Patent Office
Patented Nov. 25, 1969

---

3,480,322
SUN VISOR
Lud Pollak, R.F.D. 3, Pocatello, Idaho 83201
Filed Mar. 29, 1968, Ser. No. 717,260
Int. Cl. B60j *3/02*
U.S. Cl. 296—97                                      1 Claim

ABSTRACT OF THE DISCLOSURE

A slip-over sun visor extension comprising a sleeve of opaque or transparent material having a bottom extension panel and cut-outs in its upper edge which slips over the regular sun visor to provide full protection when driving against the blinding glare of the sun.

BACKGROUND OF THE INVENTION (1) The field of this invention lies in an automobile accessory and in particular a demountable sleeve shaped sun visor extension for the regular sun visor of the automobile.

(2) Heretofore, the regular sun visor of an automobile lacked the safety and full protection for the driver when driving against the blinding glare of the sun because it did not obscure the areas immediately below and to the sides and top of the regular sun visor.

SUMMARY OF THE INVENTION

An object of this invention is to provide a sun visor attachment in the form of a sleeve which slips over the regular sun visor with an extension at the bottom in order to provide the driver with greater safety and full protection when driving against the blinding glare of the sun.

Another object is to provide such sun visor attachment constructed of durable light weight material that will easily slide horizontally on the regular visor from one horizontal position to another so as to selectively obscure areas around the regular visor as required by the driver.

Still another object is to have a sun visor attachment as recited above arranged to slide horizontally on the existing sun visor into any horizontal position behind the windshield so as to be able to position it where the sun is in the driver's line of vision without in any manner impairing the driver's visibility.

A further object is to provide such a sun visor attachment as above recited which can be instantly, rapidly and safety moved from one position to another for varying directions of road travel.

And still another object is to provide such a sun visor attachment that will remain in any adjusted position while requiring no special gripping and securing devices in its construction.

And finally, the sun visor attachment of this invention is characterized by the ability to be moved quickly with simplicity of movement and instant re-positioning.

BRIEF DESCRIPTION OF THE DRAWINGS

FIG. 1 is a front elevation of the sun visor attachment incorporating the features of this invention.

FIG. 2 is an end elevation of the sun visor attachment shown in FIG. 1.

FIG. 3 is a stretched out view of the sheet from which the sun visor attachment shown in FIGS. 1 and 2 is made.

DESCRIPTION OF THE PREFERRED EMBODIMENT

The sun visor attachment comprises a sleeve 10 made from a single sheet 11 of durable light weight material such, for example, as plastic or other suitable material that would easily slide horizontally on the regular sun visor 12 from one horizontal position 13 to another 14. The material of the sheet 11 may be non-transparent or partially transparent.

The sheet 11 comprises two main panels 15 and 16 having integral flaps 17 and 18 connected together at the fold 19 thus forming re-entrant notches 20 and 21 in the side edges 22 and 23 of the sheet 11. The end edges 24 and 25 have lower extension panels 26 and 27 formed integral therewith.

The panel 15 is folded over the panel 16 by folding the sheet along the line 19 bringing the lower extension 26 over the mating lower extension 27. The faces of the extensions 26 and 27 are adhesively or by other suitable means secured together at 28 so as to form an open ended sleeve between the fold 19 and the attachment lines 29 of the lower extensions 26 and 27 with the panels 15 and 16. The sleeve structure may readily be slipped over the regular sun visor 12 with the facing inside surfaces of the sleeve portion of the sun visor attachment frictionally slidingly engaging the sun visor 12 allowing the attachment to be quickly adjusted to desired horizontal positions while at the same time the attachment will remain in any adjusted position. The offset lower extension 26–27 serves to critically cut off the sun while the driver has full unobstructed view each side of or below the extension while driving directly into the sun. The lower extension of the emergency visor to be of material pliable enough to easily bend should it brush the body of the driver and to readily restore itself to its original shape. Firm enough to maintain its shape, even though it is moved back and forth horizontally many thousands of times.

The emergency slip-over sun visor attachment would be approximately 11″ to 12″ long and about 10″ to 11″ high. The size depending mostly on the size of the sun visor already installed in the vehicle. The size being approximately 50% as long horizontally as the existing sun visor and approximately 40 to 60% longer vertically than existing sun visor which it is designed to supplement. It is designed and shaped to slide on existing sun visor into any horizontal position behind the windshield, positioning it where the sun is in the driver's line of vision without in any manner impairing the driver's visibility.

The shape of the attachment would be designed and formed so as to be able to cover the furtherest left end of the windshield as well as the furtherest right end of the driver's half portion of the windshield, also to extend about 3″ below the installed sun visor in the vehicle. Similar design and construction to be applied to the right sun visor sleeve attachment.

While the apparatus herein disclosed and described constitutes a preferred form of the invention, it is also to be understood that the apparatus is capable of mechanical alteration without departing from the spirit of the invention.

I claim:
1. A sun visor attachment comprising:
(A) a flat sheet of flexible opaque material having,
(B) a pair of main panels,
(C) integral flaps extending from the tops of each of the panels connected together at a fold line,
(D) and lower extension panels formed on and extending from a portion of the bottom edges of the panels,
(E) the lower extension panels being secured together when the sheet is folded at the fold line forming an open ended sleeve between the fold line and the junction of the lower extension panel with the end edges of the panels.

(F) and both side edges of the sheet having re-entrant notches formed therein adjacent to and each side of the fold line.

References Cited

UNITED STATES PATENTS 2,432,674  12/1947  Office.
2,948,566  8/1960  Massey.

FOREIGN PATENTS 680,758  10/195  Great Britain.

LEO FRIAGLIA, Primary Examiner